Aug. 31, 1948.  S. DUVALL  2,448,089
TORCH CUTTING MACHINE
Filed Dec. 27, 1943
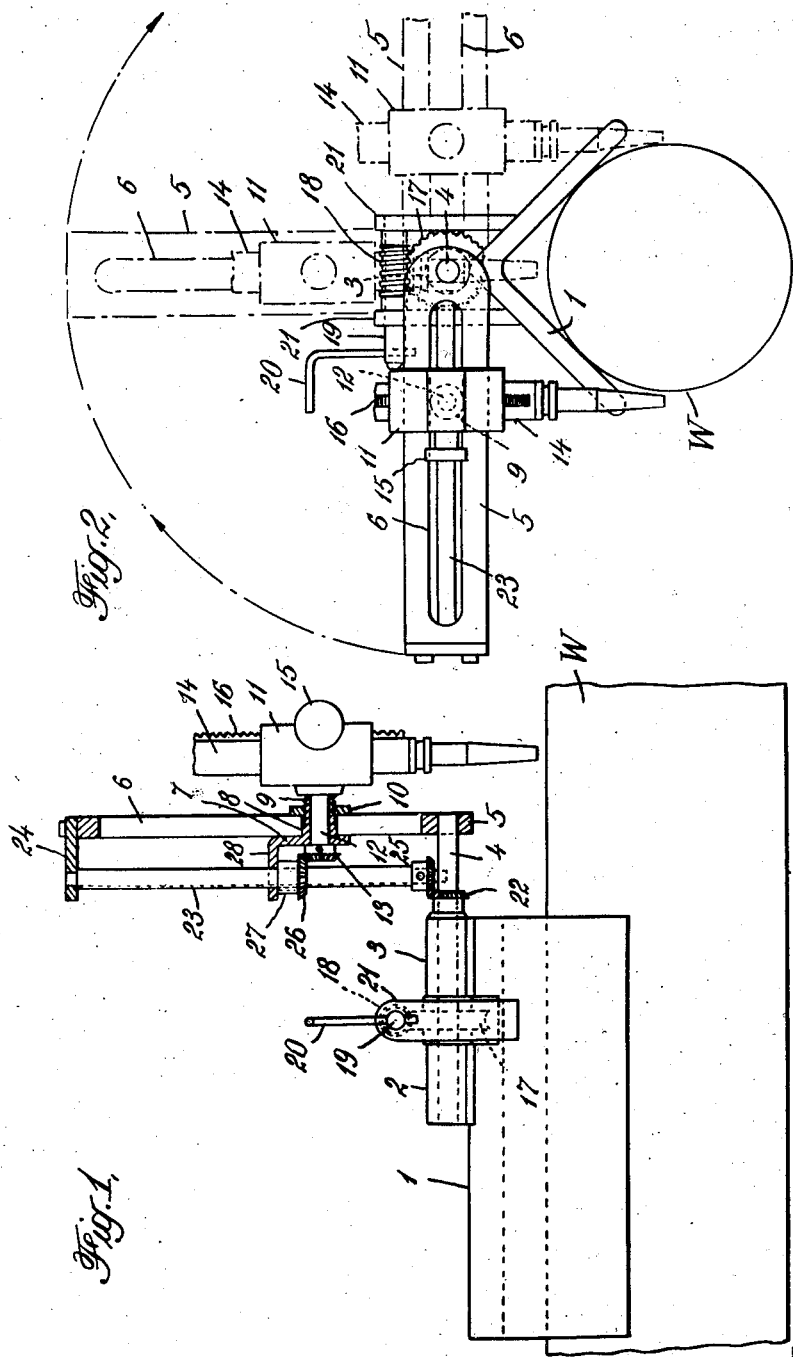
INVENTOR
Samuel Duvall
BY
ATTORNEYS Patented Aug. 31, 1948

2,448,089

UNITED STATES PATENT OFFICE 2,448,089

TORCH CUTTING MACHINE

Samuel Duvall, Highland Park, Mich., assignor to Air Reduction Company, Incorporated, a corporation of of New York Application December 27, 1943, Serial No. 515,747

13 Claims. (Cl. 266—23)

This invention relates to apparatus for cutting round metal stock, such as billets, bars and the like, by means of a gas cutting torch.

The principal object of the invention is to provide a cutting machine in which there is simple mechanism for causing the tip of the torch to move across the work-piece in an arcuate path conforming substantially with the contour of the work-piece and for causing the torch to remain perpendicular as the torch traverses the work.

According to the invention the cutting torch is moved across the work-piece in an arcuate path by a torch-supporting arm which is pivotally mounted to move angularly about an axis extending lengthwise of the billet or the like to be cut. The torch holder is pivotally connected to the arm so that it can swivel relatively to the arm during the movement of the latter. The movement of the torch-supporting arm about its pivotal axis is utilized to actuate gearing which causes the torch holder to swivel with respect to the arm during the arm's angular movement to thereby maintain the torch in an upright position during the entire movement of the arm.

A cutting machine embodying the invention is illustrated in the accompanying drawing, in which:

Figure 1 is a longitudinal section of the machine with certain parts shown in section, and Fig. 2 is an end view of the machine shown in Fig. 1.

The particular machine shown in the drawing comprises a base 1 which is preferably in the form of an angle iron adapted to be supported, channel side down, on the round work-piece W. The base is either clamped in place or held in position by an arm (not shown) in a manner well understood in the art to prevent the base from tilting.

The base 1 supports two bearings 2 and 3 which may be welded to its crest. An actuating shaft 4 is rotatable in the bearings and projects forwardly beyond the base as shown in Fig. 1. The base and the bearings support the shaft 4 so that its axis extends lengthwise of the work-piece W.

A torch-supporting arm 5 is rigidly secured at one end to the end of the actuating shaft 4. As best shown in Fig. 2 this arm has a longitudinal slot 6. A bracket 7 (Fig. 1) has a sleeve portion 8 which extends through the slot 6 of the arm 5. The forward end of the sleeve portion 8 is threaded as shown at 9 to receive a clamping nut 10. In this fashion the bracket 7 may be adjusted lengthwise of the arm 5 and clamped in position by means of the nut 10.

A torch holder 11 has a rearwardly extending stub shaft 12 which is rotatably mounted in the sleeve portion 8 of the bracket 7. A bevel gear 13 is secured to the rear end of this stub shaft for the purpose hereinafter described. A gas cutting torch 14, such as an oxyacetylene cutting torch, is mounted in the torch holder 11 and may be adjusted vertically therein by turning a knob 15 on the torch holder. When the knob 15 is turned it rotates a pinion (not shown) in the torch holder which meshes with a rack 16 on the torch and thereby moves the torch longitudinally with respect to the holder.

The actuating shaft 4 is turned in any suitable way either by hand or by an electric motor. The drawing shows hand actuated means for turning the shaft comprising a worm wheel 17 secured to the shaft between the bearings 2 and 3, and meshing with a worm 18 carried by a worm shaft 19 adapted to be turned by a crank or handle 20. As best shown in Fig. 2 the worm shaft 19 may be rotatably supported above and at right angles to the shaft 4 by two standards 21 welded or otherwise fastened to the base 1.

At the beginning of a cutting operation the parts are in the position represented by the full lines in Fig. 2. If in this position of the arm 5 the torch tip does not properly direct the usual preheating jets (not shown) against the side of the work-piece, the arm 5 may be moved clockwise a small amount to a position where the torch can be allowed to remain stationary while the preheating jets heat to kindling temperature some portion of the surface of the work-piece that the cutting jet of oxygen will just strike when the oxygen is turned on. When the shaft 4 is turned during the cutting operation the arm 5 moves angularly in a clockwise direction about the axis of the shaft 4. The broken lines in Fig. 2 represent the position of the arm and the torch in the mid-position of the arm and in the final position at the end of the cutting operation. Of course, the movement of the arm 5 and the torch during the cutting operation could be from right to left as viewed in Fig. 2 instead of from left to right as above described.

The torch is maintained in a perpendicular position during the entire movement of the arm 5 as follows: A stationary bevel gear 22 (Fig. 1) concentric with the actuating shaft 4 is affixed to the forward bearing 3. A rotatable shaft 23 located behind the arm 5 and extending lengthwise of it has its outer end journalled in a bearing 24 carried by the outer end of arm 5 and its inner end journalled in the actuating shaft 4.

The inner end of the shaft 23 has affixed to it a bevel gear 25 which meshes with the stationary bevel gear 22. A bevel gear 26 on the shaft 23 meshes with the bevel gear 13 at the rear end of the stub shaft of the torch holder. This gear 26 is carried by a sleeve 27 which abuts against a rearwardly extending portion 28 on the bracket 7 through which the shaft 23 loosely passes. The gear 26 and its sleeve 27 are keyed to the shaft 23 so that when the bracket 7 is adjusted lengthwise of the arm 5 the gear and its sleeve slide on the shaft but the driving connection from the shaft 23 to the gear 13 on the torch holder stub shaft is maintained in any position of the bracket.

It will now be seen that as the arm 5 moves angularly about the axis of the shaft 4 the shaft 23 moves bodily with it. However, since the gear 25 rotates in a planetary fashion about the stationary gear 22 the shaft 23 is rotated about its own axis during movement of the arm. This produces rotation of the gear 26 and the gear 13 on the stub shaft of the torch holder. Thus the torch holder and the torch are caused to swivel relatively to the arm 5 about the axis of the stub shaft 12 during the movement of the arm that moves the torch across the work-piece. The gear ratio is such that this relative swiveling action will be the right amount to maintain the torch in perpendicular position at all times.

The machine can be set to cut work-pieces of different diameter by adjusting the bracket 7 and consequently the torch holder lengthwise of the arm 5. Since the base of the machine is in the form of an angle iron, the torch is automatically centered with respect to the work-piece to be cut when the machine is placed on the work-piece.

I claim:

1. A torch cutting machine for cutting round metal stock such as billets, bars and the like, comprising a base, a torch-supporting arm mounted on said base for pivotal angular movement about an axis extending lengthwise of the work-piece, means for moving the arm angularly about said axis, a torch holder pivotally connected to said arm so that it can swivel with respect to the arm about an axis parallel to said first-mentioned axis, a torch mounted in said torch holder, and means connecting the torch holder and the base and actuated by pivotal angular movement of the arm about said first-mentioned axis to positively turn the torch holder relative to said arm about the axis of its pivotal connection to the arm at such a rate and in such direction as to maintain the torch in a perpendicular direction during said angular movement of the arm.

2. A torch cutting machine for cutting round metal stock such as billets, bars and the like, comprising a base, an actuating shaft rotatably mounted on said base and whose axis extends legnthwise of the work-piece, a torch-supporting arm secured to said shaft, a torch holder having a stub shaft rotatably supported by said arm whereby the torch holder can swivel relatively to the arm about the axis of its stub shaft, a torch mounted in said torch holder, means for turning said actuating shaft to produce angular movement of said arm about the axis of such shaft, a gear on said stub shaft, and means connecting the base and said gear, said means being operated by angular movement of the arm about the axis of said actuating shaft to turn the stub shaft and the torch holder relatively to the arm at such a rate and in such direction as to maintain the torch in a perpendicular direction during such angular movement of the arm.

3. A torch cutting machine for cutting round metal stock such as billets, bars and the like, comprising a base, an actuating shaft rotatably mounted on said base and whose axis extends lengthwise of the work-piece, a torch-supporting arm secured to said shaft, a torch holder having a stub shaft rotatably supported by said arm whereby the torch holder can swivel relatively to the arm about the axis of its stub shaft, a torch mounted in said torch holder, means for turning said actuating shaft to produce angular movement of said arm about the axis of such shaft, a stationary gear mounted on said base concentric with said actuating shaft, a gear secured to the stub shaft of the torch holder, and connections between said gears whereby said stub shaft and the torch holder are turned relatively to said arm during the angular movement of the arm to maintain the torch in a perpendicular position.

4. A torch cutting machine for cutting round metal stock such as billets, bars and the like, comprising a base, an actuating shaft rotatably mounted on said base and whose axis extends lengthwise of the work-piece, a torch-supporting arm secured to said shaft, a torch holder having a stub shaft rotatably supported by said arm whereby the torch holder can swivel relatively to the arm about the axis of its stub shaft, a torch mounted in said torch holder, means for turning said actuating shaft to produce angular movement of said arm about the axis of such shaft, a gear secured to said stub shaft, and means for turning said gear during the angular movement of said arm to maintain the torch in a perpendicular position.

5. A torch cutting machine for cutting round metal stock such as billets, bars and the like, comprising a base, an actuating shaft rotatably mounted on said base and whose axis extends lengthwise of the work-piece, a torch-supporting arm secured to said shaft, a torch holder having a stub shaft rotatably supported by said arm whereby the torch holder can swivel relatively to the arm about the axis of its stub shaft, a torch mounted in said torch holder, means for turning said actuating shaft to produce angular movement of said arm about the axis of such shaft, a stationary gear mounted on said base concentric with said actuating shaft, a gear secured to the stub shaft of the torch holder, and connections for rotating said last-mentioned gear during the angular movement of said arm to maintain the torch in a perpendicular position, said connections comprising a rotatable shaft movable with said arm, a gear secured to said shaft meshing with said stationary gear, and a second gear on said shaft meshing with the gear on the stub shaft of the torch holder.

6. A torch cutting machine for cutting round metal stock such as billets, bars and the like, comprising a base, an actuating shaft rotatably mounted on said base and whose axis extends lengthwise of the work-piece, a torch-supporting arm secured to said shaft, a bracket carried by said arm and adjustable lengthwise thereof, a torch holder having a stub shaft rotatably supported by said bracket, a torch mounted in said torch holder, means for turning said actuating shaft to produce angular movement of said arm about the axis of such shaft, and means for maintaining the torch perpendicular during such movement of the arm, said means comprising a second rotatable shaft movable bodily with said arm, a gear secured to said second shaft, a stationary gear mounted on the base concentric with the actuating shaft and meshing with said gear on the second shaft whereby the second shaft is rotated about its own axis when the arm is moved angularly, a gear secured to the stub shaft of the torch holder meshing with an additional gear on said second shaft, said additional gear being keyed to its shaft to enable it to slide thereon whereby said means for maintaining the torch perpendicualr is operative for any adjustment of said bracket and torch holder lengthwise of said arm.

7. A torch cutting machine for cutting round metal stock such as billets, bars and the like, comprising an angle iron constituting a base adapted to be supported channel side down on the round work-piece to be cut, a pair of bearings secured to the crest of said angle iron, a horizontal actuating shaft rotatably mounted in said bearings so that its axis extends lengthwise of the work-piece, said shaft having a portion which projects forwardly beyond the angle iron, an arm affixed to the forward end of said shaft, a worm wheel affixed to said shaft between the bearings, means for rotating said worm wheel to produce angular movement of said arm about the axis of said shaft, a torch holder having a stub shaft rotatably supported by said arm whereby the torch holder can swivel relatively to the arm about the axis of said stub shaft, a torch mounted in said torch holder, a second rotatable shaft movable bodily with said arm, a gear secured to said second shaft, a stationary gear affixed to the forward one of said bearings concentric with said actuating shaft and meshing with said gear on the second shaft whereby said second shaft is rotated about its own axis when the arm is moved angularly and a gear secured to the stub shaft of the torch holder meshing with an additional gear on said second shaft.

8. A torch cutting machine for cutting round metal stock such as billets, bars and the like, comprising a base, an actuating shaft rotatably mounted on said base and whose axis extends lengthwise of the work-piece, a torch supporting arm secured to said shaft, means for rotating the shaft to produce angular movement of said arm about the axis of such shaft, said arm having a longitudinal slot, a bracket adapted to be clamped to said arm and adjustable longitudinally in said slot, a torch holder having a stub shaft rotatably supported by said bracket, a torch mounted in said torch holder, and connections between the base and the stub shaft on the torch holder including gearing for positively turning said stub shaft and the torch relatively to said arm to maintain the torch in a perpendicular position, said connections being actuated by angular movement of the arm and operative for any position to which said bracket is adjusted on said arm.

9. A torch cutting machine for transversely cutting round metal stock such as billets, bars and the like, comprising a base, a single torch-supporting arm mounted on said base for pivotal angular movement about an axis extending lengthwise of the work-piece, means for moving the arm angularly about said axis, a torch holder supported solely by said arm and pivotally connected thereto so that it can swivel relatively to the arm about an axis parallel to said first-mentioned axis, a torch mounted in said torch holder, and means actuated by angular movement of said arm about said first-mentioned axis to positively turn the torch holder relatively to said arm about the axis of its pivotal connection to the arm and to cause it to move across the work-piece in a transverse plane in such manner that the axis of the torch in its several positions is substantially parallel.

10. A bar-cutting machine comprising a base, a pivot carried by said base, an arm supported by said pivot for movement about the axis thereof, a torch holder supported solely by said arm, a bearing on the arm in which the torch holder is angularly movable about an axis extending transversely of the length of the arm, and means for turning the torch holder in said bearing with respect to the arm through an angle substantially equal to any angle through which the arm moves about its pivot axis, said means including an element fixed to the base, a rotatable element carried by the arm and movable around the fixed element on the base in response to swinging movement of the arm about its pivot axis, and motion-transmitting connections through which the angular movement of said rotatable element causes the torch holder to turn in said bearing.

11. A machine for cutting rounds comprising a base, a pivot carried by the base, an arm supported by said pivot, a torch-holder supporting bearing carried by and adjustable along said arm, the axis of said bearing being substantially parallel to the axis of said pivot, a torch holder rotatably mounted in said bearing, a stationary gear on the base, a second gear mounted to mesh with said first gear and to roll therearound about an axis concentric with the axis of the pivot, and gearing connecting said second gear with the torch holder for causing the torch holder to turn with respect to the arm, as the arm turns about the axis of said pivot, in proportion to the angular movement of the arm.

12. A round cutting machine comprising an inverted V-shaped base adapted to rest on the surface of a round to be cut with the line of intersection of the sides of the V-shaped base substantially parallel to the axis of the round, a pivot carried by the base, an arm connected to said pivot and movable about the axis thereof, a torch-holder support carried by and adjustable lengthwise along the arm to adjust the distance of the support toward and from said pivot, a torch holder carried by the support and rotatable with respect to said support about an axis substantially parallel to the axis of said pivot, said torch being so carried by said support as to support a torch over a round on which the base is placed and beyond the end of the base, motion-transmitting connections extending lengthwise along the arm from a position near the center of angular movement of the arm to the torch-holder support, and an element carried by the base and about which a part of said motion-transmitting connections rolls in response and in proportion to the movement of the arm about said pivot.

13. A cutting machine comprising a base, an arm for moving a torch across a work-piece, a bearing on the base about which said arm is movable angularly about a substantially horizontal axis, a torch holder carried by the arm and horizontally spaced beyond said bearing and beyond the base, a torch-holder supporting connecting the torch holder to the arm, the torch holder being angularly movable relative to said arm about an axis substantially parallel to the axis of angular movement of the arm, means for adjusting the position of the torch-holder support lengthwise of the arm to increase and decrease the distance of the torch-holder support from the axis about which the arm moves, a drive shaft extending lengthwise of said arm, bearings on the arm adjacent opposite ends of the shaft, a fixed gear segment on the base substantially concentric with the bearing about which the arm moves, gear means mounted to mesh with said fixed segment and to roll thereon in response to angular movement of the arm, said gear means being connected to the drive shaft for turning the drive shaft, and other gear means movable with the torch support lengthwise along the arm and turnable with the shaft for transmitting motion of the shaft to said torch support.

SAMUEL DUVALL.

REFERENCES CITED

The following references are of record in the file of this patent:

UNITED STATES PATENTS

| Number | Name | Date |
|---|---|---|
| 1,176,584 | Madgett | Mar. 21, 1916 |
| 1,260,316 | Bryce | Mar. 26, 1918 |
| 1,687,001 | Bishop | Oct. 9, 1928 |
| 1,858,078 | Douglass et al. | May 10, 1932 |
| 1,885,107 | Brown | Nov. 1, 1932 |
| 2,054,847 | Anderson | Sept. 22, 1936 |
| 2,233,669 | Lawrance | Mar. 4, 1941 |
| 2,283,345 | Young | May 19, 1942 |
| 2,339,567 | Granat | Jan. 18, 1944 |

FOREIGN PATENTS

| Number | Country | Date |
|---|---|---|
| 546,009 | Great Britain | June 23, 1942 |